US012565870B2

(12) United States Patent
Juchems et al.

(10) Patent No.: US 12,565,870 B2
(45) Date of Patent: Mar. 3, 2026

(54) VALVE ARRIVAL TIME DETECTION IN FUEL SYSTEM HAVING DUAL SOLENOID OPERATED VALVES

(71) Applicant: Caterpillar Inc., Peoria, IL (US)

(72) Inventors: Mitchell B. Juchems, Eureka, IL (US); Daniel R. Puckett, Peoria, IL (US); Andrew O. Marrack, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 430 days.

(21) Appl. No.: 18/352,563

(22) Filed: Jul. 14, 2023

(65) Prior Publication Data

US 2025/0020095 A1 Jan. 16, 2025

(51) Int. Cl.

| | |
|---|---|
| ***F02M 59/36*** | (2006.01) |
| ***F02D 41/40*** | (2006.01) |
| ***F02M 51/06*** | (2006.01) |
| ***F02M 65/00*** | (2006.01) |

(52) U.S. Cl.

CPC ....... *F02M 51/0617* (2013.01); *F02D 41/401* (2013.01); *F02M 65/005* (2013.01); *F02D 2200/0618* (2013.01); *F02M 2200/20* (2013.01)

(58) Field of Classification Search

CPC ............. F02D 41/20; F02D 2041/2055; F02D 2041/2058; F02D 2041/224; F02D 2200/0618; F02D 41/30; F02M 47/027; F02M 45/04; F02M 45/00; F02M 63/0063

USPC .......................................................... 123/458

See application file for complete search history.

(56) References Cited

U.S. PATENT DOCUMENTS

| | | | | |
|---|---|---|---|---|
| 11,230,990 B2 | | 1/2022 | Caterpillar | |
| 11,280,245 B2 | | 3/2022 | Delphi | |
| 11,293,370 B1 | * | 4/2022 | Puckett | F02D 41/20 |
| 11,795,886 B2 | * | 10/2023 | Marrack | F02D 41/20 |
| 2017/0191437 A1 | * | 7/2017 | Yanoto | F02D 41/20 |
| 2021/0140386 A1 | | 5/2021 | Puckett | |

FOREIGN PATENT DOCUMENTS

| | | |
|---|---|---|
| CN | 102536566 A | 7/2012 |
| DE | 102011076113 B4 | 4/2016 |
| WO | 2022171822 A1 | 4/2022 |

* cited by examiner

*Primary Examiner* — Hung Q Nguyen
*Assistant Examiner* — James J Kim
(74) *Attorney, Agent, or Firm* — Brannon Sowers & Cracraft PC

(57) ABSTRACT

Operating a fuel injector in a fuel system for an engine includes energizing a first solenoid actuator to move a spill valve from a first position to a second, closed position, and energizing a second solenoid actuator to move a fuel injection valve in the fuel injector from a closed position to an open position. A pull-in tier of a waveform energizing the second solenoid actuator is generated via a first current produced by a boosted voltage power supply and a second current produced by a lower voltage power supply. Arrival timing of the valve at the open position is detected based on a property of the second current, such that a valve arrival timing error may be used to trim the fuel injector. Related methodology and control logic is also disclosed.

20 Claims, 2 Drawing Sheets

VALVE ARRIVAL TIME DETECTION IN FUEL SYSTEM HAVING DUAL SOLENOID OPERATED VALVES

TECHNICAL FIELD

The present disclosure relates generally to controlling a fuel injector in a fuel system, and more particularly to detecting an arrival timing of a fuel injection valve.

BACKGROUND

Internal combustion engine systems employ a range of operating and logic strategies for controlling fuel systems. In a typical fuel system a plurality of fuel injectors are each associated with one of a plurality of combustion cylinders in an engine. The fuel injectors are electronically controlled and receive electrical control currents from an engine control system. The control currents cause energizing of solenoids or other electrical actuators in or associated with the fuel injectors to adjust valves therein that determine the timing and manner of injection of fuel.

One fuel system configuration widely applied in the field of compression-ignition diesel engines utilizes a direct operated nozzle check that is opened and closed to start and end fuel injection based on a hydraulic pressure applied to a surface of the nozzle check. A spill valve in the fuel injector controls fluid connection between a plunger cavity and a low-pressure space or outlet. When the spill valve is open a plunger in the fuel injector reciprocates passively to exchange fuel between a plunger cavity and the low pressure space. When the spill valve is closed the plunger can pressurize fuel in the fuel injector, with fuel injection started and ended based on controlling the direct operated nozzle check.

Engineers have experimented for decades with energization of electrical actuators for such valves in fuel injectors. Controlling energization of the solenoids in various ways can result in various desired properties of fuel injection, including fuel injection timing, fuel injection pressure, and fuel injection rate shape in some instances. Over the course of a service life of a fuel system the performance of individual injectors can change, sometimes resulting in valve operational changes in response to control signals that can affect fuel injection amount, start of injection or end of injection timing, rate shape, or other factors. Engineers are continually seeking for improved and alternative ways to monitor and control specific aspects of fuel injector operation to various ends including emissions mitigation and overall system efficiency. United States Patent Application Publication No. US20210140386A1 illustrates a typical spill valve fuel injector arrangement.

SUMMARY OF THE INVENTION

In one aspect, a method of operating a fuel injector in a fuel system for an engine includes energizing a first solenoid actuator to move a first valve in a fuel injector from a first position to a second position, and energizing a second solenoid actuator to move a fuel injection valve in the fuel injector from a closed position to an open position. The method further includes generating a pull-in tier of a waveform energizing the second solenoid actuator via a first current produced by a boosted voltage power supply and a second current produced by a lower voltage power supply, and detecting an arrival timing of the fuel injection valve at the open position based on a property of the second current.

In still another aspect, a fuel system for an engine includes a fuel injector having a first solenoid actuator and a first valve operably coupled to the first solenoid actuator, and a second solenoid actuator and a fuel injection valve operably coupled to the second solenoid actuator. The fuel system further includes a boosted voltage power supply, a lower voltage power supply, and a fueling control unit. The fueling control unit is structured to energize a first solenoid actuator to move the first valve from a first position to a second position, energize the second solenoid actuator to move the fuel injection valve from a closed position to an open position, and generate a pull-in tier of a waveform energizing the second solenoid actuator via a first current produced by the boosted voltage power supply and a second current produced by the lower voltage power supply. The fueling control unit is further structured to detect an arrival timing of the fuel injection valve at the open position based on a property of the second current.

In still another aspect, a fuel control system for a fuel system in an engine includes a fueling control unit having a solenoid energizing waveform controller structured to energize a first solenoid actuator in a fuel injector to move a first valve in the fuel injector from a first position to a second position, energize a second solenoid actuator in the fuel injector to move a second valve in the fuel injector from a closed position to an open position, and generate a pull-in tier of a waveform energizing the second solenoid actuator via a first current produced by a first power supply and a second current produced by a second power supply. The solenoid energizing waveform controller is further structured to detect an arrival timing of the second valve at the open position based on a property of the second current, and trim the fuel injector based on the detected arrival timing of the valve at the second position.

DETAILED DESCRIPTION

Figure 1:
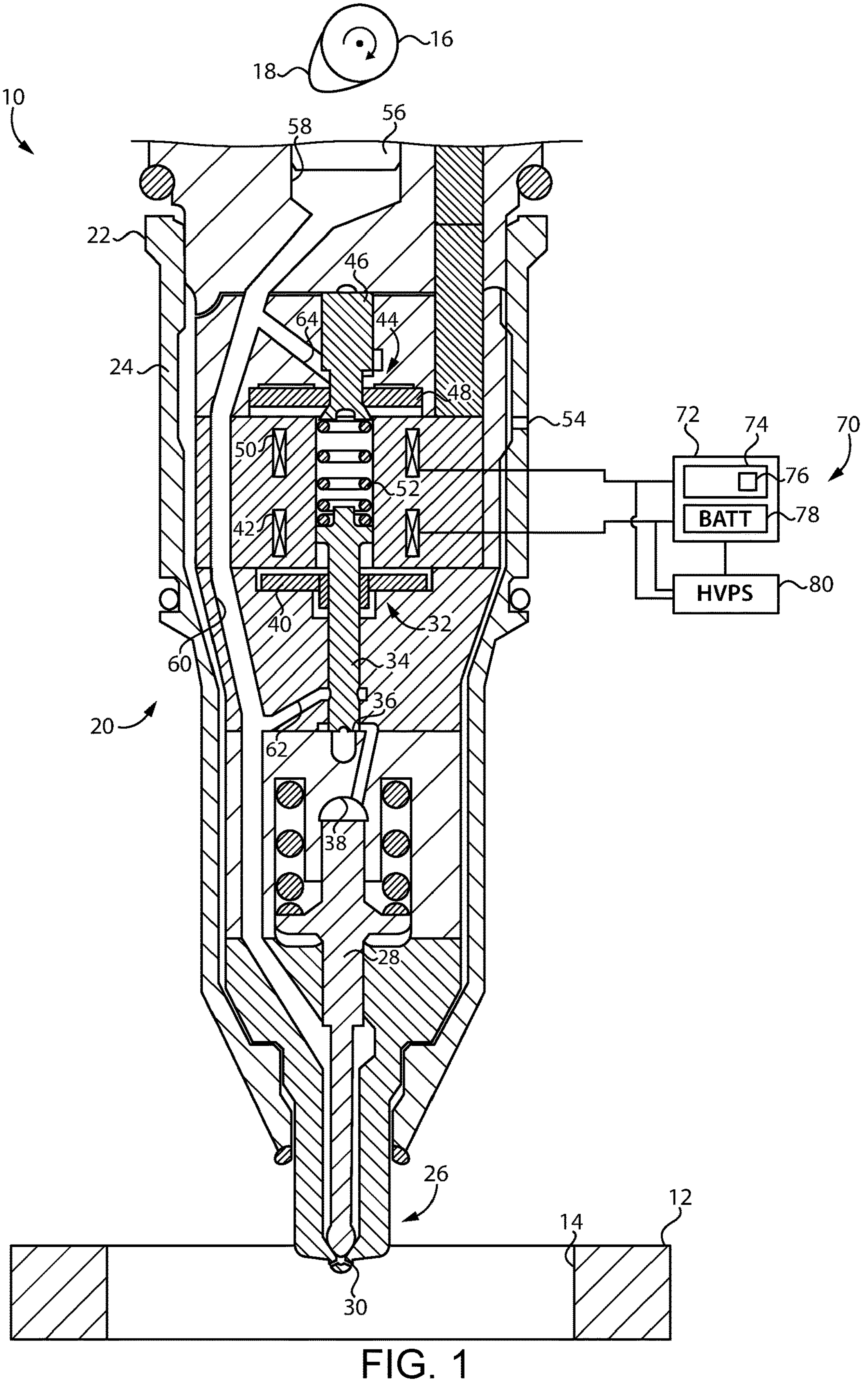
FIG. 1 is a sectioned diagrammatic view of an internal combustion engine system, according to one embodiment.

Referring to FIG. 1, there is shown an internal combustion engine system 10, according to one embodiment. Engine system 10 includes an internal combustion engine 12 having a combustion cylinder 14 formed therein. Combustion cylinder 14 may be one of any number of combustion cylinders in engine 12 in any suitable arrangement such as an in-line pattern, a V-pattern, or still another. Engine 12 will typically be equipped with an intake system, an exhaust system, engine valves, and various other apparatus not explicitly shown. A piston will be movable in combustion cylinder 14 between a top-dead-center (TDC) position and a bottom-dead-center (BDC) position, typically in a conventional four-cycle pattern. Engine 12 may be compression-ignited and operated on a suitable compression-ignition fuel such as a diesel distillate fuel although the present disclosure is not limited as such. Engine 12 may also include a rotatable crankshaft (not shown) coupled by way of a geartrain with a rotatable camshaft 16 having a cam lobe 18. Camshaft 16 will typically include a plurality of cam lobes arranged to operate equipment including fuel injectors in engine system 10, as further discussed herein.

Engine system 10 further includes a fuel system 20. Fuel system 20 will typically include a plurality of fuel injectors each positioned to extend partially into one of a plurality of combustion cylinders in engine 12. In FIG. 1 one fuel injector 22 is shown associated with combustion cylinder 14, and it will be appreciated that description and discussion of fuel injector 22 should be understood by way of analogy to refer to any other fuel injectors of fuel system 20. Fuel injector 22 includes an injector housing 24 having a nozzle 26 that extends into combustion cylinder 14. A plurality of nozzle outlets 30 are formed in nozzle 26 and fluidly communicate with combustion cylinder 14. Fuel injector 22 also includes a direct operated check or DOC 28 movable in injector housing 24 to open and close nozzle outlets 30 to directly inject a liquid fuel, such as diesel distillate fuel, into combustion cylinder 14. DOC 28 is directly hydraulically operated on the basis of a fluid pressure, typically a fluid pressure of fuel, in a pressure control chamber 38. In the illustrated embodiment, DOC 28 includes a needle valve or needle check. According to the present disclosure, DOC may be understood as a fuel injection valve that directly controls fuel injection. A fuel injection control valve, itself controlling a needle or other nozzle check, as further discussed herein, may also be understood as a fuel injection valve in the present context.

Fuel injector 22 also includes an injection control valve assembly 32. Injection control valve assembly 32 is operable to control a closing hydraulic pressure in pressure control chamber 38 to enable opening and closing of DOC 28. Injection control valve assembly 32 includes an injection control valve 34 movable in fuel injector 22 to open and close a valve seat 36. Injection control valve 34 could include one or valves, including separate but contacting valve members in some embodiments. When valve seat 36 is opened pressure control chamber 38 can fluidly connect to a low pressure space 54 defined by injector housing 24 enabling DOC 28 to open and permit spraying of fuel from nozzle outlets 30. When valve seat 36 is closed an increased hydraulic pressure is seen in pressure control chamber 38 and causes DOC 28 to close. An armature 40 is coupled with injection control valve 34. Armature 40 is associated with a solenoid actuator 42 that can be energized to magnetically attract armature 40 and open valve seat 36. When solenoid actuator 42 is deenergized a biasing spring 52 urges injection control valve 34 closed against valve seat 36. Injection control valve 34 is thus movable in fuel injector 22 in response to energizing solenoid actuator 42 to vary a closing hydraulic pressure on DOC 28.

Fuel injector 22 also includes a spill valve assembly 44. Spill valve assembly 44 includes a spill valve 46 coupled with an armature 48 and a solenoid actuator 50. When solenoid actuator 50 is energized armature 48 is magnetically attracted toward solenoid actuator 50. When solenoid actuator 50 is deenergized biasing spring 52 urges armature 48 and spill valve 46 away from solenoid actuator 50. Spill valve 46 is thus understood to be movable in fuel injector 22 in response to energizing solenoid actuator 50, and is biased toward an open position. As described herein solenoid actuator 50 may be understood as a first solenoid actuator and spill valve 46 understood as a first valve, whereas solenoid actuator 42 may be understood as a second solenoid actuator and DOC 28 understood as a second valve or a fuel injection valve. The terms "first" and "second" are used herein merely for convenience and not in any limiting sense.

Fuel injector 22 also includes a plunger 56 movable in a plunger cavity 58, fluidly connected to spill valve 46. In an implementation plunger 56 is mechanically cam-actuated by way of rotation of camshaft 16, in a generally known manner. When spill valve 46 is open, upward movement of plunger 56 causes fuel to be drawn into plunger cavity 58 such as by way of a spill passage 64 from low pressure space 54. Downward movement of plunger 56 causes the fuel to be discharged from plunger cavity 58 through spill passage 64 and back to low pressure space 54. When spill valve 46 is closed fluid communication between plunger cavity 58 and low pressure space 54 is blocked and advancement of plunger 56 causes fuel pressure in plunger cavity 58 to increase. The increased fuel pressure is communicated by way of a nozzle supply passage 60 to the vicinity of nozzle outlets 30. When DOC 28 is lifted, at a desired timing, fuel sprays from nozzle supply passage 60 out of nozzle outlets 30. Another fluid passage 62 fluidly connects between nozzle supply passage 60 and injection control valve 34.

In the illustrated embodiment spill valve assembly 44 is resident in fuel injector 22. In other embodiments a spill valve assembly could be positioned externally to fuel injector 22. Also in the illustrated embodiment the hydraulic control fluid used for direct control of DOC 28 is fuel. In other instances a different fluid, such as engine oil, could be used for direct control of a nozzle outlet check. Plunger 56 may be equipped with a tappet contacted by cam lobe 18. In other instances, a rocker arm actuation assembly could be interposed plunger 56 and camshaft 16.

Fuel system 20 also includes a fuel control system 70. Fuel control system 70 includes an electronic control module or ECM 72 having thereon a fueling control unit or ECU 74. ECU 74 can be, or can include, a programmable logic controller such as a microprocessor or microcontroller and suitable computer readable memory storing program control instructions which, when executed, cause fuel injector 22 to operate according to the present disclosure. Any suitable computer readable memory such as RAM, ROM, EPROM, DRAM, SDRAM, FLASH, or still another could be used. Fueling control unit 74 further includes an energizing waveform controller 76 including software, hardware, or combinations that can perform the valve detection and electronic trimming functions discussed herein. Fuel control system 70 also includes a lower voltage power supply such as a battery 78, and a boosted, higher voltage power supply 80. In the present description higher voltage power supply may include a first power supply, and lower voltage power supply 80 may be understood as a second power supply. The terms "first" and "second" are used herein merely for convenience, and not in any limiting sense. Battery 78 is shown as part of ECM 72 but could be a separate apparatus in other embodiments. Higher voltage power supply or HVPS 80 is shown physically separated from ECM 72 but could also be a part of ECM 72 in some embodiments. As will be further apparent from the following description, fuel control system 70 is uniquely configured to operate fuel injector 22 to detect an arrival timing of a valve, including an arrival timing of fuel injection valve or DOC 28 at an open position, enabling trimming fuel injector 22 to improve performance as further discussed herein.

Those skilled in the art will be familiar with the concept of electronic trimming. In the fuel systems field electronic trimming can be used to vary the timing, duration, magnitude, and potentially other properties of electrical control currents sent to electrical actuators in a fuel injector to improve or optimize fuel injector performance. The present disclosure provides a unique valve arriving timing detection and electronic trimming strategy implemented in methodology and control logic that can exploit and improve precision and accuracy in determining a valve arrival timing, such as an arrival timing of DOC 28 at an open position.

It will be recalled fuel injector 22 includes a solenoid actuator 50 for spill valve 46. It will also be recalled fuel system 20 includes boosted voltage or HVPS power supply 80 and lower voltage power supply or battery 78. Fueling control unit 74 and energizing waveform controller 76, the capabilities and functionalities of which are referred to at times interchangeably herein, may be structured to energize solenoid actuator 50 using at least one of HVPS 80 or battery 78 to adjust spill valve 46 from a first position, such as an open position, to a second position, such as a closed position. Fueling control unit 74 may be further structured to energize solenoid actuator 42 to move DOC 28 from a first position, such as a closed position blocking outlets 30, to an open position.

Figure 2:
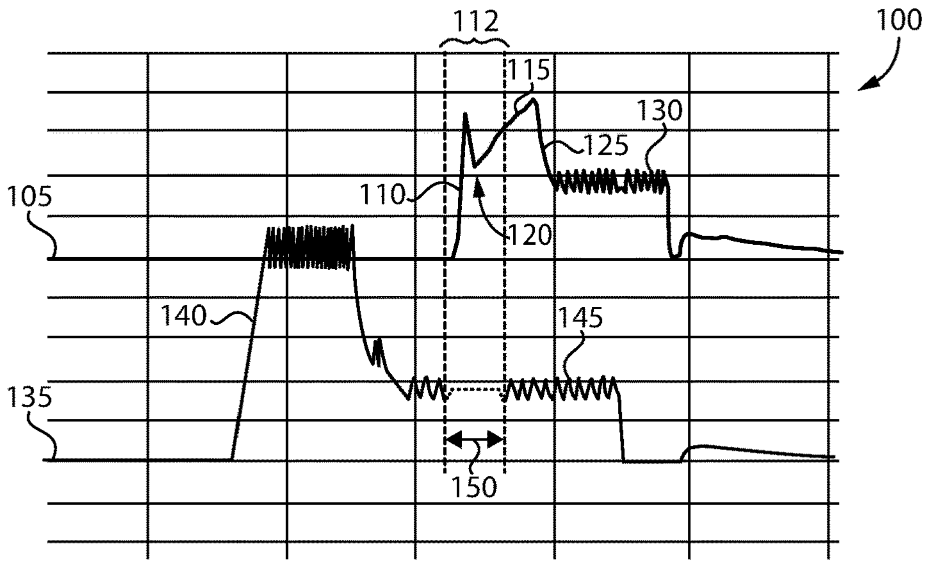
FIG. 2 is a graph of solenoid energization in a fuel injector, according to one embodiment.

Referring also now to FIG. 2, there is shown a graph 100 illustrating a spill valve energizing waveform 135 and a DOC energizing waveform 105. Waveform 135 includes a pull-in current 140 that forms a pull-in tier to move spill valve 46 from the open position to the closed position. Pull-in current 140 will typically be generated via HVPS 80 to energize solenoid actuator 48, although in some instances a pull-in tier could be produced using both HVPS 80 and battery 78 during energizing solenoid actuator 48, or still another way. Waveform 135 also includes a hold-in current 145 forming a hold-in tier that holds spill valve 46 at the closed position before ceasing or reducing to allow spill valve 46 to return to the open position via biasing spring 52. Hold-in current 145 will typically be a chopped current. As further discussed herein, detecting an arrival timing of DOC 28 may occur during generating hold-in current/tier 145. The present disclosure observes that interference between magnetic properties of solenoid actuators 42 and 50 might frustrate efforts to detect electrical properties of one of the two circuits when both circuits are energized and/or being monitored. When solenoid actuator 50 is energized via a chopped current interference between the two circuits can limit accuracy and/or precision in measuring electrical properties of the circuit energizing solenoid actuator 42. Hence fueling control unit 74 may be structured to pause chopping the electrical current 145 of the hold-in tier during a valve arrival timing window 150 for DOC 28, chopping current 145 before valve arrival timing window 150 and after valve arrival timing window 150 but not during. Valve arrival timing window 150 may be determined empirically or by estimation in some instances.

Waveform 105 includes a first current 110 produced by HVPS 80 and a second current 115 produced by battery 78, first current 110 and second current 115 together generating a pull-in tier 112 of waveform 105. ECU 74 is thus structured to switch between HVPS 80 and battery 78 during pull-in tier 112. Waveform 105 also includes a local minimum electrical property at a location 120. Switching from HVPS to battery 78 allows detection, or improved detection, of the electrical properties of waveform 105 corresponding to a valve arrival timing, in other words a time that armature 40 reaches a stop position and ceases producing back EMF into the circuit energizing solenoid actuator 40. When injection control valve 34 reaches its fully open stop position DOC 28 will typically be fully open. Following pull-in tier 112, electrical current is reduced at 125 and a hold-in tier generated via a third current 130 typically produced via HVPS 80.

Detecting the valve arriving timing 120 enables electronically trimming fuel injector 22, such as by calculating a valve arrival timing error based on comparing the detected valve arrival timing to a nominal or otherwise expected valve arrival timing, and then taking action on the calculated valve arrival timing error. In one embodiment, a start of current timing of first current 110 is advanced or retarded to electronically trim fuel injector 22 toward a desired valve arrival timing, reducing errors in fuel injection amount and/or timing or improving other fuel injector operating parameters. Also in a typical implementation, the detected valve arrival timing includes a valve arrival timing in a first engine cycle, and fueling control unit 74 is structured to trim fuel injector 22 in a subsequent engine cycle based on the valve arrival timing error.

INDUSTRIAL APPLICABILITY

Figure 3:
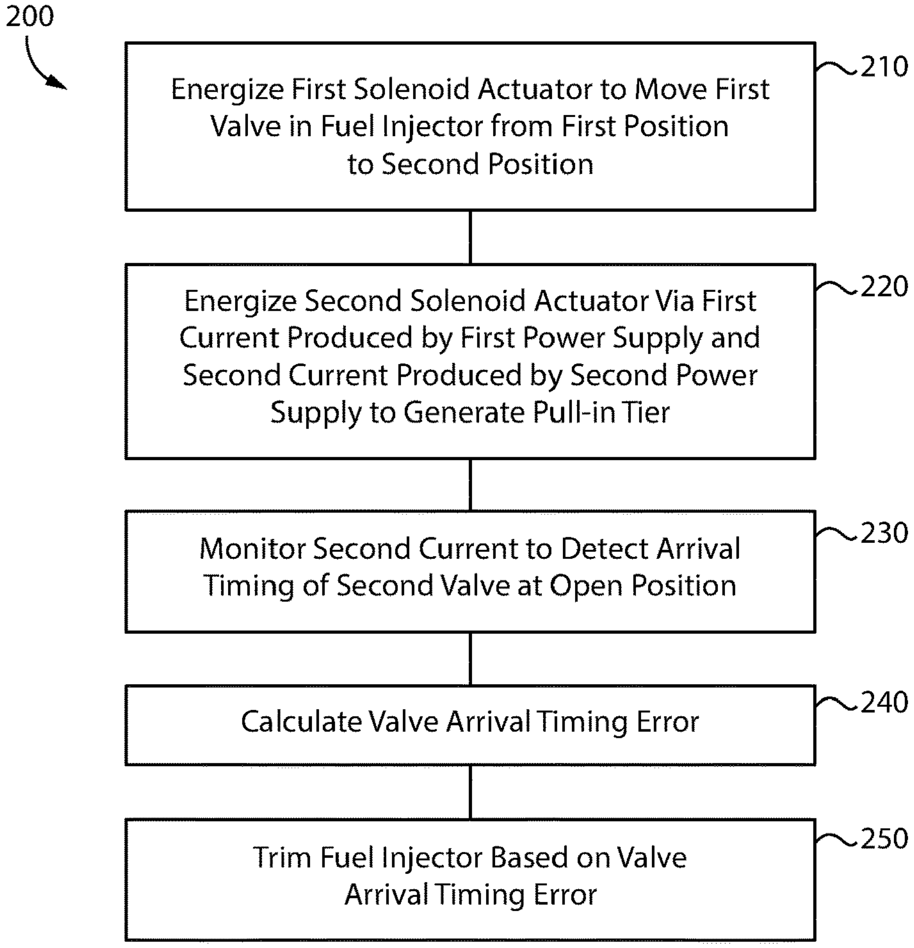
FIG. 3 is a flowchart illustrating example methodology and logic flow, according to one embodiment.

Referring to the drawings generally, but focusing now on FIG. 3, there is shown a flowchart 200 illustrating example methodology and logic flow according to one embodiment. At a block 210, first solenoid actuator 50 is energized to commence moving first valve 44 in fuel injector 22 from a first, open position, to a second, closed position. From block 210, flowchart 200 advances to a block 220 to energize second solenoid actuator 42 via a first current produced by a first power supply (e.g. HVPS 80) and a second current produced by a second power supply (e.g. battery 78). As discussed herein, second valve 34 commences moving from a first, closed position to a second, open position in response to energizing solenoid actuator 42.

From block 220 flowchart 200 advances to a block 240 to monitor the second current to detect arrival timing of the second valve at the second, open position. From block 230 flowchart 200 advances to a block 240 to calculate a valve arrival timing error. From block 240 flowchart 200 advances to a block 250 to trim fuel injector 250 based on the valve arrival timing error as discussed herein.

A process the same or similar to that of flowchart 200 can be repeated for each individual fuel injector, typically sequentially injector to injector in engine system 10. The diagnostics discussed herein can be performed at regularly scheduled intervals, or when engine system operating conditions exist justifying performing diagnostics and electronically trimming, such as might be indicated by monitoring engine operation for performance degradation or deviations from optimal operation. The present disclosure could also be applied in some instances as part of preparing a new fuel system for service.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a fuel injector in a fuel system for an engine comprising:

energizing a first solenoid actuator to move a first valve in a fuel injector from a first position to a second position;

energizing a second solenoid actuator to move a fuel injection valve in the fuel injector from a closed position to an open position;

generating a pull-in tier of a waveform energizing the second solenoid actuator via a first current produced by a boosted voltage power supply and a second current produced by a lower voltage power supply; and detecting an arrival timing of the fuel injection valve at the open position based on a property of the second current.

2. The method of claim 1 wherein the first valve includes a spill valve, and the fuel injection valve includes a needle check coupled to an injection control valve assembly including the second solenoid actuator.

3. The method of claim 2 wherein the injection control valve assembly includes an injection control valve movable in the fuel injector in response to the energizing a second solenoid actuator to vary a closing hydraulic pressure on the needle check.

4. The method of claim 1 wherein the lower voltage power supply includes a battery, and further comprising generating a hold-in tier of the waveform energizing the second solenoid actuator via the boosted voltage power supply.

5. The method of claim 1 further comprising generating a pull-in tier and a hold-in tier of a waveform energizing the first solenoid actuator, and wherein the detecting an arrival timing of the fuel injection valve includes detecting the arrival timing during the generating a hold-in tier of a waveform energizing the first solenoid actuator.

6. The method of claim 5 further comprising pausing chopping an electrical current of the hold-in tier during a valve arrival timing window.

7. The method of claim 1 wherein the detecting a valve arrival timing includes detecting the valve arrival timing based on a local minimum property of the lower voltage second current.

8. The method of claim 1 further comprising calculating a valve arrival timing error based on the detected valve arrival timing, and trimming at least one of the voltage or a current of the fuel injector based on the valve arrival timing error.

9. The method of claim 8 wherein the trimming of at least one of the voltage or a current of the fuel injector includes varying a start of current timing of the first current.

10. A fuel system for an engine comprising:

a fuel injector including a first solenoid actuator and a first valve operably coupled to the first solenoid actuator, and a second solenoid actuator and a fuel injection valve operably coupled to the second solenoid actuator;

a boosted voltage power supply;

a lower voltage power supply;

a fueling control unit structured to:

energize a first solenoid actuator to move the first valve from a first position to a second position;

energize the second solenoid actuator to move the fuel injection valve from a closed position to an open position;

generate a pull-in tier of a waveform energizing the second solenoid actuator via a first current produced by the boosted voltage power supply and a second current produced by the lower voltage power supply; and detect an arrival timing of the fuel injection valve at the second position based on a property of the second current.

11. The fuel system of claim 10 wherein the fuel injection valve includes a needle check coupled to an injection control valve assembly including the second solenoid actuator.

12. The fuel system of claim 11 wherein the first valve includes a spill valve fluidly connected to a plunger cavity formed in the fuel injector, and the fuel injector further includes a cam-actuated plunger movable within the plunger cavity.

13. The fuel system of claim 10 wherein the property of the lower voltage second current includes a local minimum property.

14. The fuel system of claim 10 wherein the fueling control unit is further structured to:

generate a pull-in tier and a hold-in tier of a waveform energizing the first solenoid actuator; and detect the arrival timing of the fuel injection valve during the generated hold-in tier of a waveform energizing the first solenoid actuator.

15. The fuel system of claim 14 wherein an electrical current of the hold-in tier is chopped prior to and after a valve arrival timing window, and not chopped during the valve arrival timing window.

16. The fuel system of claim 10 wherein:

the detected valve arrival timing includes a valve arrival timing in a first engine cycle; and the fueling control unit is further structured to calculate a valve arrival timing error, and to trim at least one of the voltage or a current of the fuel injector in a subsequent engine cycle based on the valve arrival timing error.

17. A fuel control system for a fuel system in an engine comprising: a fueling control unit including a solenoid energizing waveform controller structured to:

energize a first solenoid actuator in a fuel injector to move a first valve in the fuel injector from a first position to a second position;

energize a second solenoid actuator in the fuel injector to move a second valve in the fuel injector from a closed position to an open position;

generate a pull-in tier of a waveform energizing the second solenoid actuator via a first current produced by a first power supply and a second current produced by a second power supply; and detect an arrival timing of the second valve at the open position based on a property of the second current; and trim at least one of the voltage or a current of the fuel injector based on the detected arrival timing of the valve at the second position.

18. The fuel control system of claim 17 wherein the fueling control unit is further structured to:

generate a pull-in tier and a hold-in tier of a waveform energizing the first solenoid actuator; and detect the arrival timing of the fuel injection valve during the generated hold-in tier of a waveform energizing the first solenoid actuator.

19. The fuel control system of claim 18 wherein the fueling control unit is further structured to pause chopping an electrical current of the hold-in tier during a valve arrival timing window.

20. The fuel control system of claim 17 wherein the fueling control unit is further structured to generate a hold-in tier of the waveform energizing the first solenoid actuator via the boosted voltage power supply.

* * * * *